STEINER & MILLER.
Roller and Harrow.
No. 54,790.                           Patented May 15, 1866.
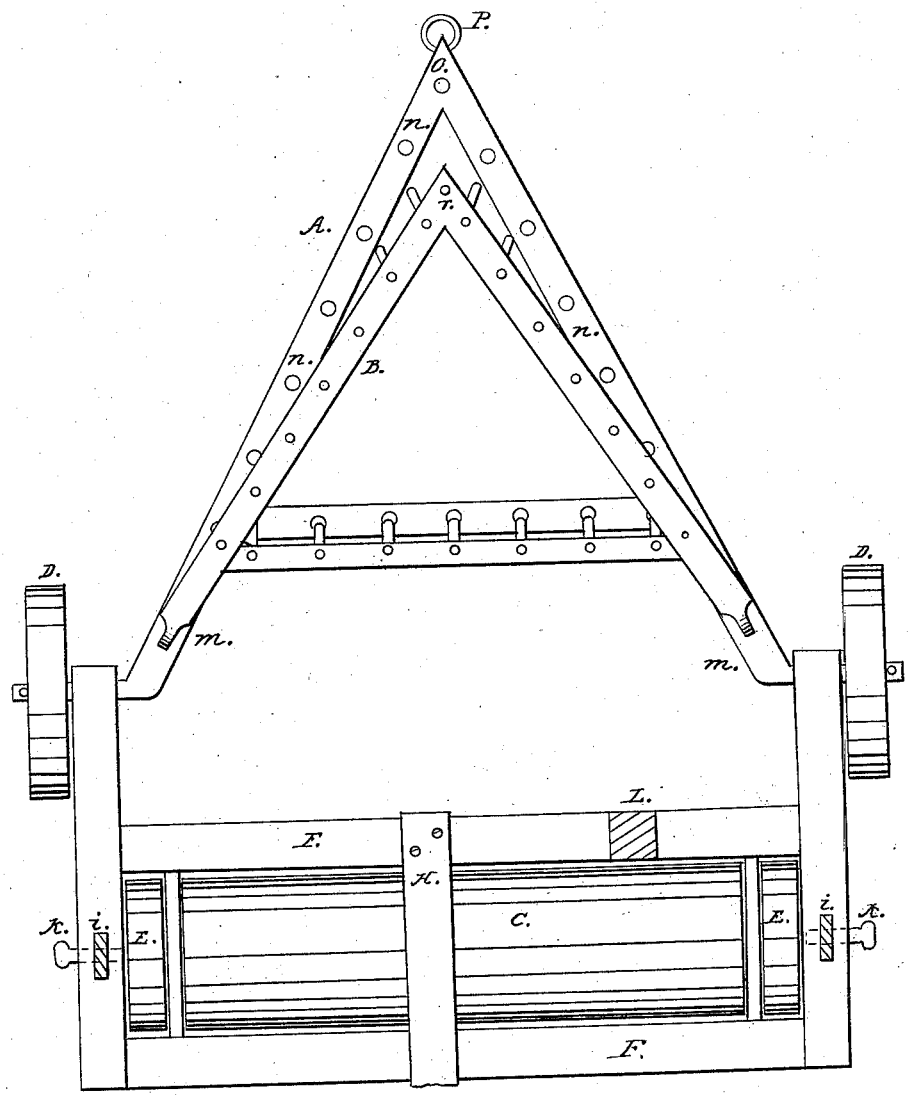

United States Patent Office.

JOHN STEINER AND JOHN P. MILLER, OF HARRISBURG, OHIO.

IMPROVEMENT IN COMBINED HARROW AND ROLLER.

Specification forming part of Letters Patent No. 54,790, dated May 15, 1866.

*To all whom it may concern:*

Be it known that we, JOHN STEINER and JOHN P. MILLER, of Harrisburg, in the county of Montgomery, in the State of Ohio, have invented a new and Improved Mode of Constructing a Combined Harrow and Roller; and we do hereby declare that the following is a full and exact description thereof, reference being had to the accompanying drawing, and to the letters of reference marked thereon.

The nature of our invention consists in constructing a harrow of the usual form with a drag-bar on the under surface of the frame, and to which the harrow is attached by a joint, that the harrow may be raised by a lever for the purpose of clearing the harrow of any obstructing material, the teeth passing through the drag-bar, and combined with the harrow is a roller and wheels.

To enable others skilled in the art to make and use our invention, we will proceed to describe its construction and operation.

The figure represents a top view, the harrow being elevated to show the drag-bar.

B represents the harrow, which is constructed in the usual manner, with the exception of a joint formed on either side at $m\,m$ with the drag-bar A, upon which the harrow freely turns. The drag-bar has a series of orifices, $n\,n\,n$, corresponding in number to the harrow-teeth, and through which the teeth pass. The ends of the drag-bar have bearings attached to the frame, on which the ends freely move, and on the ends external to the frame are wheels D D, which support with the roller the frame and harrow when passing to and from the field.

A wheel, which may be dispensed with, is constructed like a caster, and is attached at $o$ to support the point of the harrow when not in use.

At $p$ a ring is shown, to which the team is hitched.

To the post L is attached a bent lever, (not shown in the drawing,) and the end of this lever is connected to the harrow at $r$ by a cord or its equivalent. The use of the lever is to raise the harrow.

F F represent the frame, within which is the roller C and wheels E E, which have a common axle, the pieces $i\,i$ serving as a bearing for the axle, and which pieces pass through the frame and are held in position by the pins $k\,k$, which pass through the frame and the adjusting-holes of the pieces $i\,i$, thus regulating the height of the frame. A part of the arm H attached to the frame is shown, which forms a support to the seat. The seat is omitted in the drawing.

To use the combined roller and harrow the wheel at $o$ and wheels D D are detached. The driver being seated on the seat, when the harrow becomes clogged he depresses the lever and the harrow-teeth are drawn up through the drag-bar, thereby clearing the teeth of grass or other material, and on releasing the lever the harrowing is resumed.

When it is not desirable to use the roller with the harrow the roller is removed, the wheels E E supporting the frame.

The joint formed at the union of the drag-bar and harrow should be sufficiently free to let the harrow be thrown back onto the frame, and the drag-bar would thus be so perfectly relieved of weight that the supporting-wheel would not be needed at the front end of the drag-bar.

Having thus fully described our invention, what we claim, and desire to secure by Letters Patent, is—

1. The drag-bar A, constructed and arranged with reference to the harrow B, substantially as described, and for the purposes specified.

2. The combination of the harrow B, drag-bar A, the wheels D D E E, and the roller C, in the manner substantially as described, and for the purposes specified.

JOHN STEINER.
JOHN P. MILLER.

Witnesses:
SAMUEL K. RALM,
THOS. D. MITCHELL.